United States Patent
Anetzberger et al.

(10) Patent No.: US 9,453,568 B2
(45) Date of Patent: Sep. 27, 2016

(54) DRIVEN AXLE FOR A MOTOR VEHICLE

(71) Applicant: ZF Friedrichshafen AG, Friedrichshafen (DE)

(72) Inventors: Michael Anetzberger, Hauzenberg (DE); Robert Peter, Rossbach (DE); Manfred Geier, Ruderting (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/477,139

(22) Filed: Sep. 4, 2014

(65) Prior Publication Data
US 2015/0065286 A1  Mar. 5, 2015

(30) Foreign Application Priority Data
Sep. 4, 2013  (DE) .................. 10 2013 217 590

(51) Int. Cl.
| F16H 48/06 | (2006.01) |
| F16H 48/38 | (2012.01) |
| F16H 48/08 | (2006.01) |
| F16H 57/04 | (2010.01) |

(52) U.S. Cl.
CPC .............. *F16H 48/06* (2013.01); *F16H 48/08* (2013.01); *F16H 48/38* (2013.01); *F16H 57/0401* (2013.01); *F16H 57/0457* (2013.01)

(58) Field of Classification Search
CPC ... F16H 57/0454; F16H 57/472; F16H 48/06
See application file for complete search history.

(56) References Cited

U.S. PATENT DOCUMENTS

| 2,015,108 A | 9/1935 | Harper |
| 2,037,173 A | 4/1936 | Matthews |
| 2,061,009 A * | 11/1936 | Rothrock ................ F16H 48/08 475/230 |
| 2,182,889 A | 12/1939 | Carlson |
| 3,825,099 A | 7/1974 | Hopf |
| 3,887,037 A | 6/1975 | Haluda et al. |
| 4,227,427 A | 10/1980 | Dick |
| 6,398,689 B1 | 6/2002 | Morse et al. |
| 6,533,090 B2 | 3/2003 | Osborn et al. |

FOREIGN PATENT DOCUMENTS

| DE | 10 2010 039 444 | 2/2012 |
| GB | 624970 | 6/1949 |

OTHER PUBLICATIONS

German Patent Office Search Report, Feb. 22, 2014.

* cited by examiner

*Primary Examiner* — Derek D Knight
(74) *Attorney, Agent, or Firm* — Dority & Manning, P.A.

(57) ABSTRACT

A drivable axle, in particular a rigid axle, is provided for a motor vehicle the axle has a differential gear, at least one gear bearing, at least one axle tube, and at least one axle shaft. The differential gear features a volume (V1) for lubricant separate from the axle tube. The differential gear is sealed at the axle tube by using a gap-type seal.

9 Claims, 8 Drawing Sheets

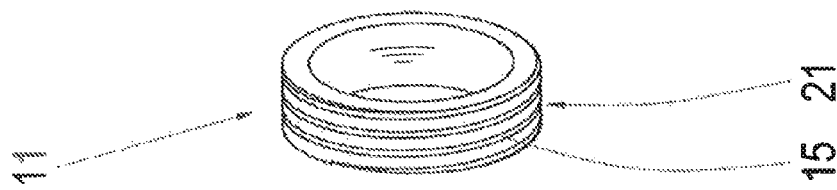
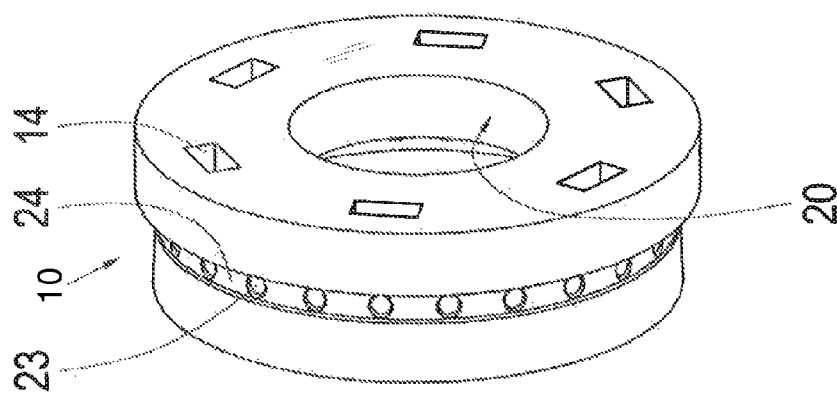
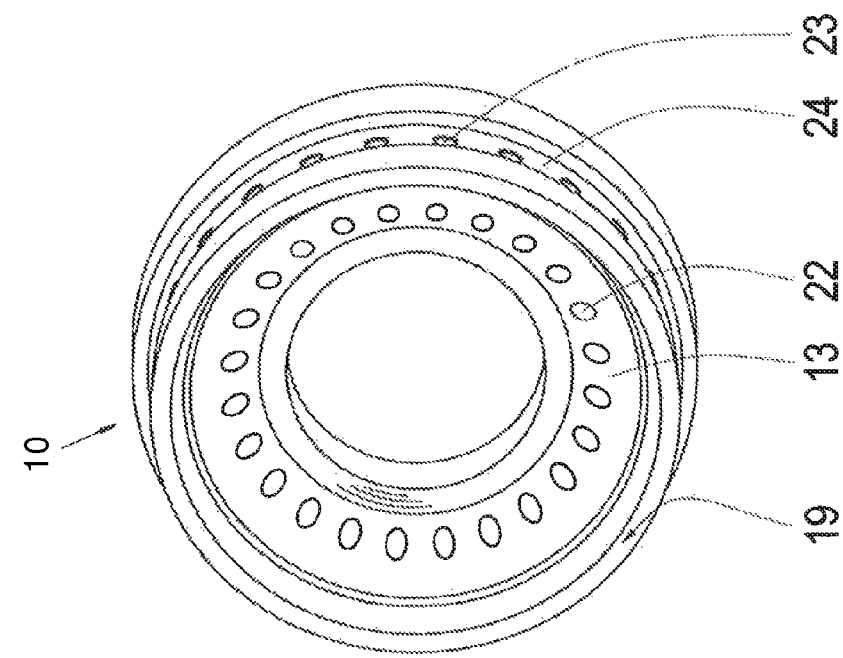

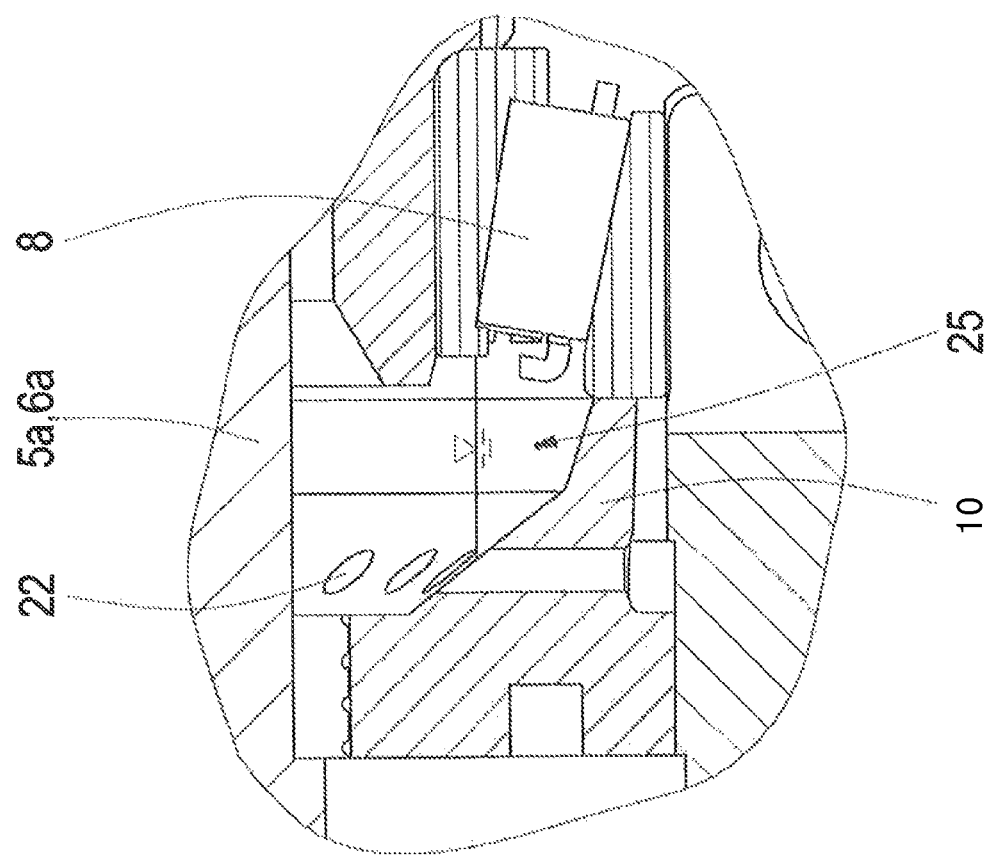

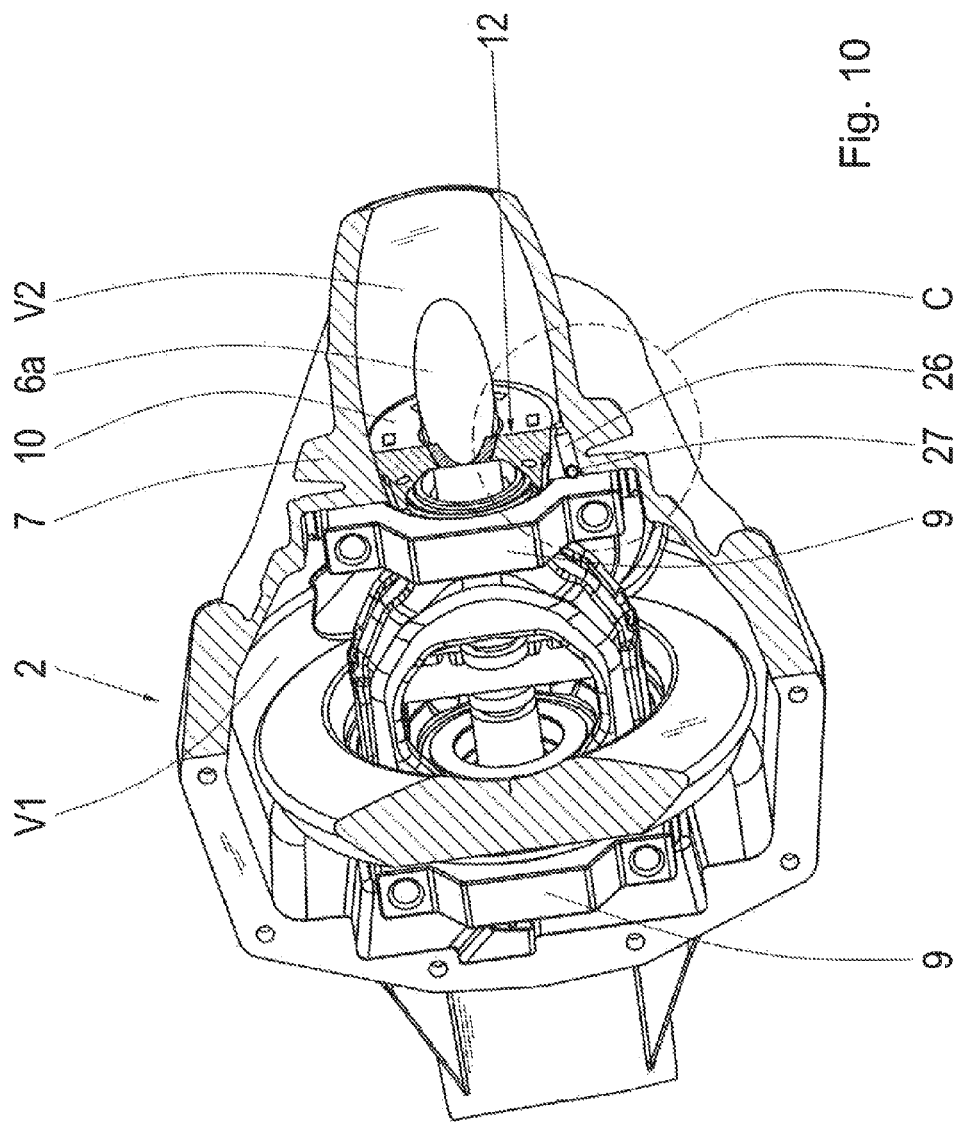

DRIVEN AXLE FOR A MOTOR VEHICLE

FIELD OF THE INVENTION

The invention relates to a drivable axle, in particular a rigid axle, for a motor vehicle, the axle featuring one differential gear, at least one gear bearing, at least one axle tube and at least one axle shaft.

BACKGROUND

A drive axle assembly for a motor vehicle is known from DE 601 30 938 T2, having one axle housing; one differential bearing; and one differential assembly that is mounted in a rotary motion inside the axle housing through the differential bearing. The differential bearing is coupled with the axle housing through a bearing cap, and whereas a hole is formed in the bearing cap. A setting nut that features at least one retaining hole is engaged with the differential bearing in such a manner that one rotation of the setting nut brings about an axial displacement of the differential bearing. One setting device lock is provided, which comprises a first section and a second section, whereas the first section features a barbed hook, which is arranged in the hole of the bearing cap, and the second section features a first locking pin, which is arranged in the retaining hole and thereby prevents the setting nut from turning relative to the bearing cap. The drive axle assembly for the first section includes an essentially cylindrical body, which features an outward-pointing section of the barbed hook for engagement with the hole of the bearing cap.

SUMMARY OF THE INVENTION

The invention is subject to the task of improving an axle described above in terms of structure and/or function. In particular, a required level of lubricant is to be reduced. In particular, a required quantity of lubricant is to be reduced. In particular, splash losses are to be reduced. In particular, sufficient lubrication is to be ensured. In particular, the risk of damage to a seal upon assembly is to be reduced. In particular, a return of any leakage is to be enabled. Additional objects and advantages of the invention will be set forth in part in the following description, or may be obvious from the description, or may be learned through practice of the invention.

The task is solved with a drivable axle for a motor vehicle that features one differential gear, at least one gear bearing, at least one axle tube, and at least one axle shaft, whereas the differential gear features a volume for lubricant separate from the at least one axle tube.

The axle may be a front axle, a central axle or a rear axle. The axle may be a floating axle. The axle may be a rigid axle. The differential gear may feature a housing. The at least one gear bearing may be arranged inside the housing. The differential gear may be a bevel differential gear. The differential gear may be a spur wheel differential gear with a planetary design. The differential gear may be a worm wheel differential gear. The differential gear may be a differential gear without a differential gear set, such as disclosed, for example, in EP1281560 A2 or in DE 102010039444 A1. The differential gear may feature at least one setting nut or setting disk for adjusting the differential gear. Using the at least one setting nut or setting disk, an engagement of the gear wheels of the differential gear, in particular of the face clearance of a set of bevel wheels, and/or a bearing preload of the gear bearing, can be adjustable. The at least one setting nut or setting disk may be supported, on the one hand, on the housing, and, on the other hand, on the at least one gear bearing.

The at least one axle shaft may be arranged radially inside at least one axle tube. The at least one gear bearing may be arranged between a differential cage and a housing of the differential gear. It may also be provided with at least one wheel bearing. The at least one wheel bearing may be arranged between the at least one axle shaft and the at least one axle tube. The volume of the differential gear for lubricant may be a first volume. The lubricant may be an oil. At least one second volume may be formed between the at least one axle shaft and the at least one axle tube. This at least one second volume may be at least largely lubricant-free or oil-free.

The differential gear may be arranged in a manner that is at least approximately centered on the axle. The axle or the differential gear may feature a first gear bearing and a second gear bearing. The axle may feature a first axle tube and second axle tube. The axle may feature a first axle shaft and a second axle shaft. The axle may feature a first wheel bearing and a second wheel bearing.

The differential gear is sealed at the at least one axle tube. For this purpose, the differential gear is sealed at the least one axle tube by using a gap-type seal. The gap-type seal may feature a first form section on the side of the axle shaft and a second form section on the side of the axle tube or on the side of the differential gear. On the at least one axle shaft, a sealing element can be arranged, in particular pressed, screwed, welded, shrunk, etc.; this features the first form section radially on the outside. The sealing element may also be a component of the at least one axle shaft. The sealing element may be ring-shaped. The sealing element may feature a rectangular cross-section. The at least one setting nut or setting disk may feature the second form section radially on the inside. The at least one setting nut or setting disk may feature an inner contour and lubricant channels for limiting a reservoir for lubricant. The at least one setting nut or setting disk may feature a cone-shaped contour section on the inside. Each of the lubricant channels may run radially. Each of the lubricant channels may flow into the cone-shaped contour section on the inside. The at least one setting nut may feature front-side recesses or other form closure elements, for example lugs, for the engagement of a tool.

A conveying effect for the lubricant can be achieved by using the first form section and/or the second form section. The first and/or the second form section may feature a predetermined surface contour for conveying the lubricant. A surface contour of the first and/or second form section for conveying the lubricant can have a predetermined surface roughness. The first and/or second form section may feature a conveyor groove. Thereby, the sealing effect is increased. The conveyor groove may run in a spiral shape on the first and/or second form section. The conveyor groove may be designed in such a manner that, upon a rotational movement of the axle shaft in the direction of rotation, which mainly occurs in the operation of the axle, a conveying effect directed at the differential gear is achieved. Thereby, for example upon a rotational movement that corresponds to a forward movement of the motor vehicle on which the axle is arranged, lubricant from the tube axle is conveyed back to the differential gear.

The differential gear may feature at least one bypass channel with a non-return valve for the gap-type seal. A valve seat may be arranged in the at least one bypass channel. A retaining element may be arranged in the at least one bypass channel. The retaining element may be displaced in a manner depending on the inertia force between an opening position and a retaining position. The at least one wheel bearing may feature a lifetime lubrication. Thus, a separate lubrication of the wheel bearing may be omitted.

Particularly optional features of the invention are referred to with "may." As a result, in each case there is an embodiment of the invention that features the particular characteristic or the particular characteristics.

The axle in accordance with the invention enables a reduced level of lubricant. A required quantity of lubricant is also reduced. Splash losses are reduced. Sufficient lubrication is ensured. The risk of damage to a seal upon assembly is reduced. A return of any leakage is enabled.

Embodiments of the invention are described in more detail below, with reference to the figures. Additional characteristics and advantages arise from this description. Specific characteristics of these embodiments may represent general characteristics of the invention. Characteristics of such embodiments that are connected with other characteristics may also represent individual characteristics of the invention.

BRIEF DESCRIPTION OF THE DRAWINGS

The following is shown schematically and by example.

Figure 1:
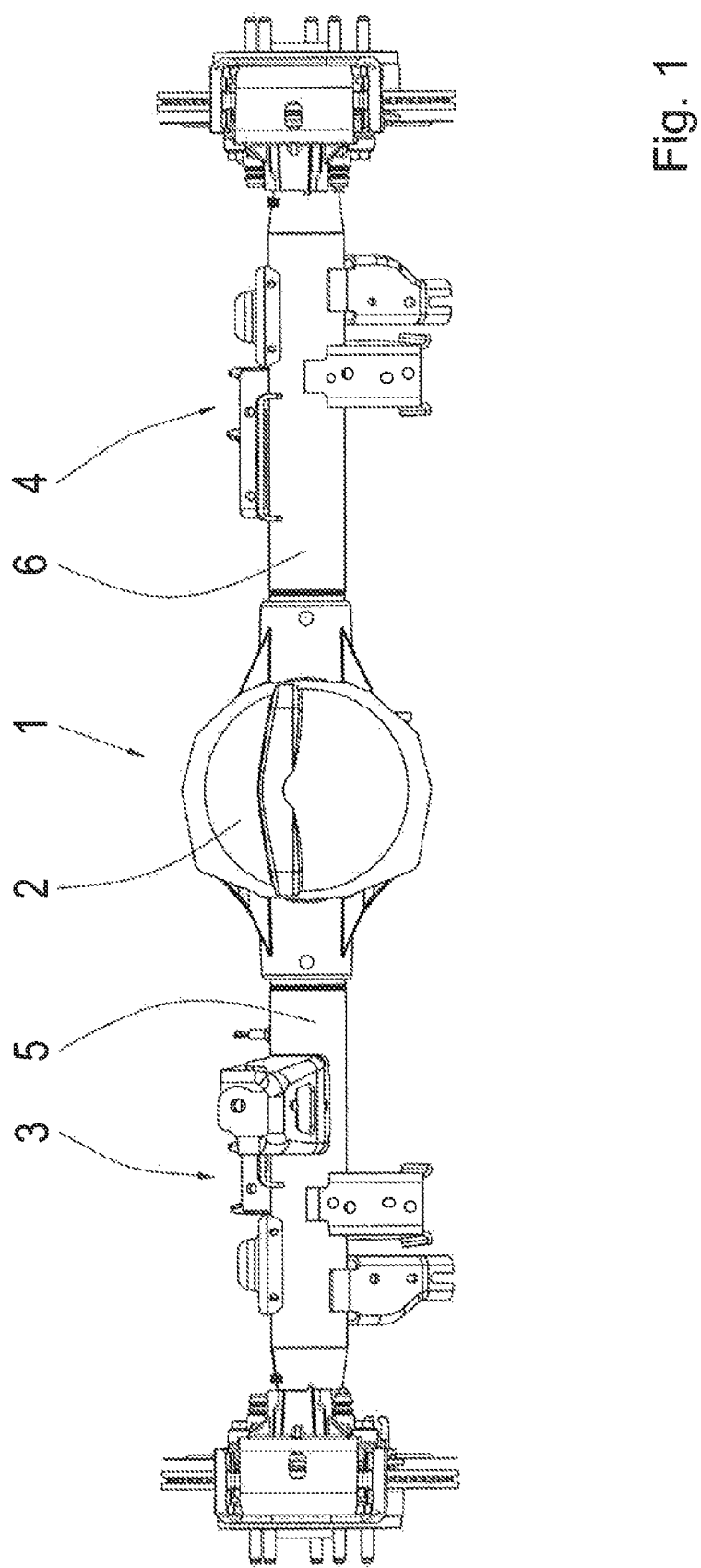
FIG. 1 a rear view of a drivable axle for a motor vehicle with one differential gear and two half axles, FIG. 2 a section view through a differential gear, FIG. 3 a three-dimensional view of a part of the differential gear from FIGS. 1 and 2, with one housing and one gear bearing arranged inside the housing, FIG. 4 an enlargement of the area of the differential gear marked with A in FIG. 2, with a gap-type seal formed by using a setting nut and a sealing element, FIG. 5 a first three-dimensional view of a setting nut with an inner cone, FIG. 6 a second three-dimensional view of a setting nut with front-side recesses for the engagement of a tool, FIG. 7 a three-dimensional view of a sealing element with an oil conveyor groove, FIG. 8 a section view of an alternative design of the differential gear with at least one setting disk instead of a setting nut, FIG. 9 an enlargement of the area of the differential gear marked with B in FIG. 2, FIG. 10 a three-dimensional, partially cut view of the differential gear from FIG. 2, FIG. 10a an enlargement of the area of the differential gear marked with C in FIG. 10, with a bypass channel with a valve retaining element in the open position, FIG. 10b an enlargement of the area of the differential gear marked with C in FIG. 10, with a bypass channel with a valve retaining element in the closed position.

In the figures, equivalent or at least functionally equivalent components are provided with the same reference signs.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 2:
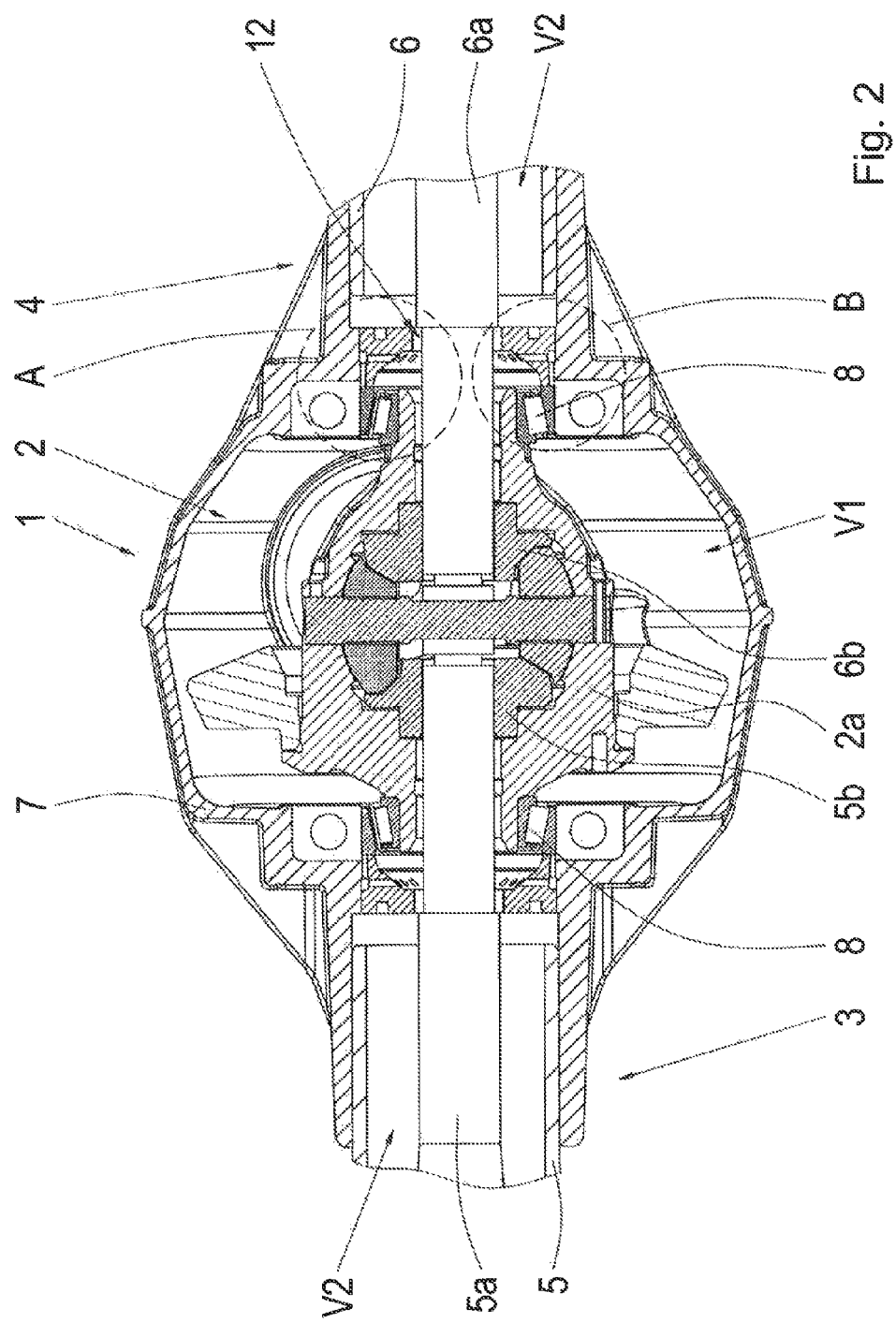

FIG. 1 shows a drivable axle 1, which (for example) is designed as a rigid axle, for a motor vehicle with a differential gear 2 and two half axles 3, 4. The axle 1 is provided for connecting to a chassis of the motor vehicle. The motor vehicle is in particular a personal vehicle or a commercial vehicle, for example, a pickup truck or small bus, etc. FIG. 2 shows a longitudinal section through the differential gear 2 of the axle 1 shown in FIG. 1.

The differential gear 2 is arranged at roughly the center of the axle 1. Starting from the differential gear 2, the half axles 3, 4 extend in opposite directions. Each of the half-axles 3, 4 features an axle tube 5, 6, and one axle shaft 5a, 6a arranged in each axle tube 5, 6.

The differential gear 2 features a transmission input, here (for example) in the form of a bevel wheel, and two transmission outputs, here (for example) in the form of two bevel wheels 5b, 6b. The transmission input is drivable starting from the drive unit of the motor vehicle. The transmission outputs 5b, 6b are used to drive the axle shafts 5a, 6a. The differential gear 2 is used to distribute a drive power and/or a drive torque at the axle shafts 5a, 6a. In a known method, the differential gear 2 features, as can be seen in FIG. 2, gear wheels that form pairs of gear wheels. The differential gear 2 features a housing 7, in which the gear wheels are arranged.

The axle tubes 5, 6 are securely connected to the housing 7 of the differential gear 2. Each of the axle shafts 5a, 6a is rotatably mounted. Each of the axle shafts 5a, 6a is mounted on the side of the differential gear and the side of the wheel. For the mounting of the axle shafts 5a, 6a on the side of the differential gear, each axle 1 features at least one gear bearing 8. For this purpose, the gear bearings 8 rotatably bear a differential cage 2a of the differential gear 2, by means of which the axle shafts 5a, 6a in turn are rotatably mounted. The gear bearings 8 are arranged inside the housing 7 of the differential gear 2. For the mounting of the axle shafts 5a, 6a on the side of the wheel, each axle 1 features at least one wheel bearing (not shown). Each of the wheel bearings is preferably lubricated for a lifetime, or has lubrication that is independent of the differential gear 2. The differential cage 2a bears a crown wheel on its outer circumference. Together with the bevel wheel that forms the transmission input, this forms a set of bevel wheels of the differential gear 2.

In the operating state, the differential gear 2 features an oil filling. A first volume V1 is formed in the housing 7 of the differential gear 2. The oil filling is contained in the first volume. In each case, a second volume V2 is formed between each of the axle shafts 5a, 6a and the associated axle tube 5, 6. In each case, the second volumes V2 are at least largely lubricant-free or oil-free.

Figure 3:
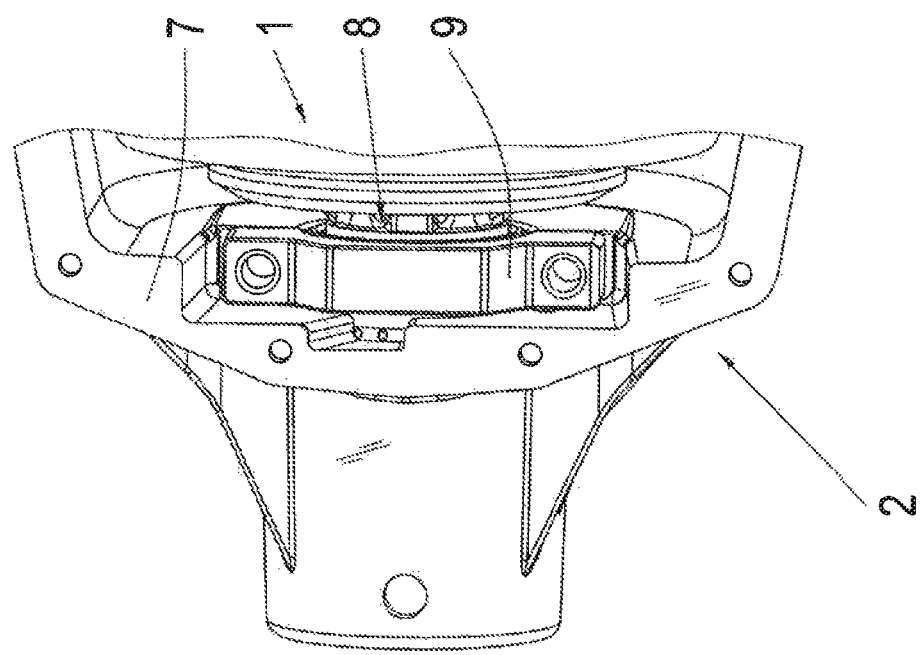

FIG. 3 shows, in three dimensions, a part of the differential gear 2 with the housing 7 and the gear bearing 8 arranged inside the housing 7. The gear bearing 8 is used for the rotational mounting of the differential cage 2a seen in FIG. 2, through which the axle shafts 5a, 6a are rotatably mounted. The gear bearing 8 is attached to the housing 7 using a bearing cap 9. In all other respects, supplemental reference is made in particular to FIGS. 1 and 2, along with the accompanying description.

Figure 4:
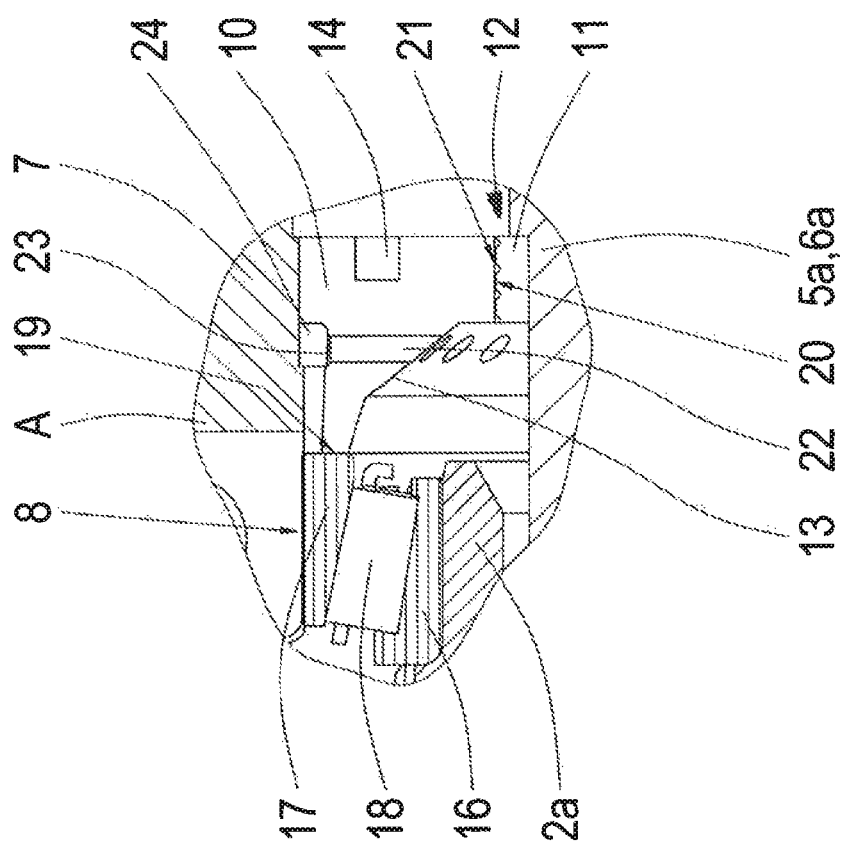

FIG. 4 shows an enlargement of the area marked with A in FIG. 2. It shows a gap-type seal 12 formed by using a setting nut 10 and a sealing element 11. FIGS. 5 and 6 show such setting nut 10 in three-dimensional views of different sides of the setting nut 10. As can be seen therein, the setting nut 10 features an inner cone 13. In addition, front-side recesses, such as 14, or any other suitable form closure elements, such as lugs (for example), are provided for the engagement of a tool for screwing in and screwing out the setting nut 10. FIG. 7 shows the sealing element 11 of FIG. 4 in a three-dimensional view. Accordingly, the sealing element 11 preferably has an oil conveyor groove 15.

As is visible in FIG. 4, the gear bearing 8 features an inner ring 16, an outer ring 17 and rolling elements, such as 18. In the present case, the gear bearing 8 is preferably designed as a tapered roller bearing, but may also be designed as a deep groove ball bearing or in another suitable form. The setting nut 10 is screwed into the housing 7 of the differential gear 2, and on the front side features a contact surface 19 for support on the outer ring 17. Using the setting nut 10, the differential gear 2 is adjustable, in particular a bearing preload of the gear bearing 8 and the face clearance of the set of bevel wheels (consisting of the crown wheel and the bevel wheel on the side of the transmission input). For this purpose, the setting nut 10 has an external thread (not shown), by which it is able to be screwed into the housing 7. The setting of the differential gear 2 takes place through the adjustment of the screw-in depth of the setting nut 10 in the housing 7.

The setting nut 10 features a cylindrical inner surface section 20. This forms a form section on the side of the differential for the gap-type seal 12. The sealing element 11 is arranged (in particular pressed, screwed, welded, shrunk, etc.) on one of the axle shafts 5a, 6a. The sealing element 11 may also be an integrated component of the respective shaft 5a, 6a. The sealing element 11 features a cylindrical outer surface 21. This forms a form section for the gap-type seal 12 on the side of the axle shaft. Thus, the inner surface section 20 of the setting nut 10 and the outer surface 21 of the sealing element 11 together form the gap-type seal 12. Using the gap-type seal 12, the first volume V1 is sealed in respect of each of the second volumes V2, such that the flowing out of the oil filling present in the housing 7 of the differential gear 2 into the axle tubes 5, 6 is largely prevented.

The inner cone 13 of the setting nut 10 is preferably, but not necessarily, arranged in a manner connected to the contact surface 19. The cylindrical inner surface section 20 of the setting nut 10 is preferably, but not necessarily, connected in an axial manner to the inner cone 13. The recesses 14 and/or form closure elements for the engagement of the tool are arranged on the front side of the setting nut 10 opposite to the contact surface 19. The setting nut 10 features oil channels, such as 22, 23, that run in a radial manner. The oil channels 22, 23 are arranged in a manner distributed in the circumferential direction. Each of the oil channels 22, 23 flows in a radial manner on the inside in the area of the inner cone 13. The oil channels 22, 23 flow in a radial manner on the outside in a circumferential annular groove 24. The sealing element 11 preferably features the oil conveyor groove 15 on its outer surface 21. The oil conveyor groove 15 is arranged around the outer surface 21 in a spiral shape. Using the oil conveyor groove 15, upon a forward movement of the motor vehicle, a conveying effect directed to the first volume V1 is achieved. In all other respects, supplemental reference is made in particular to FIGS. 1, 2 and 3 along with the accompanying description. It should be noted that the inner cone 13, the oil channels 22, 23 and the annular groove 24 need not necessarily be provided. The conveyor groove 15 may also be arranged alternatively on the inner surface section 20 of the setting nut 10, or each of the two section 20, 21 may have one such conveyor groove 15.

Figure 8:
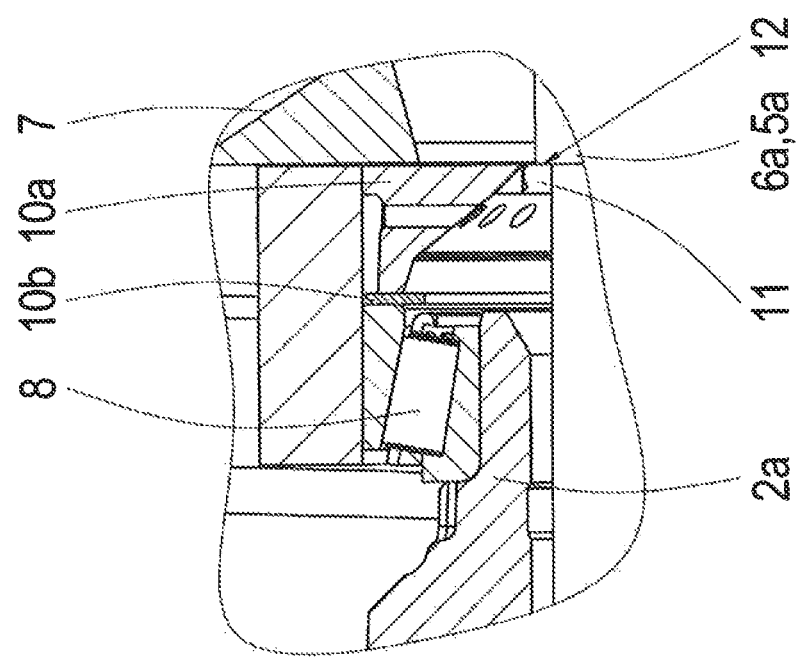

FIG. 8 shows an alternative design of the differential gear 2. In this connection, the setting nut 10 was replaced by a first and a second setting disk 10a, 10b. The design of the first setting disk 10a corresponds to the setting nut 10 shown in FIGS. 4 to 6. However, no external thread is thereby provided. The second setting disk 10b is disk-shaped or sleeve-shaped, such as, for example, a washer. The setting disks 10a, 10b are axially clamped between the gear housing 7 and the outer ring 17 of the gear bearing 8. Due to the thickness of the setting disks 10a, 10b, the differential gear is 2 adjustable, such as a bearing preload of the gear bearing 8 and the face clearance of the set of bevel wheels (consisting of the crown wheel and the bevel wheel on the side of the transmission input). Depending on the required setting of the differential gear 2, a more or less thick first and/or second setting disk 10a, 10b is provided. Optionally, the first or the second setting disk 10a, 10b can also be omitted. In all other respects, reference is made to FIGS. 4 to 6 and the accompanying description.

FIG. 9 shows an enlargement of the area marked with B in FIG. 2. The housing 7 of the differential gear 2 features an oil filling. An oil reservoir 25 is formed inside the setting nut 10. The oil reservoir 25 features a predetermined filling level. In the operation of the axle 1, thus while the motor vehicle associated with the axle is driving, the reservoir 25 is constantly filled by skidding movements inside the differential gear 2. The oil channels, such as 22 and 23, are used to maintain the filling level of the oil reservoir 25. Through the oil channels 22, 23, oil may both flow into the oil reservoir 25 and flow out of the oil reservoir 25. Through the corresponding positioning of the oil channels 22, 23 on the setting nut 10, the oil level in the reservoir 25 can be adjusted. The reservoir 25 provides a permanent and sufficient lubrication of each immediately adjacent gear bearing 8. In all other respects, supplemental reference is made in particular to FIGS. 1 to 7 and the accompanying description.

Figure 10B:
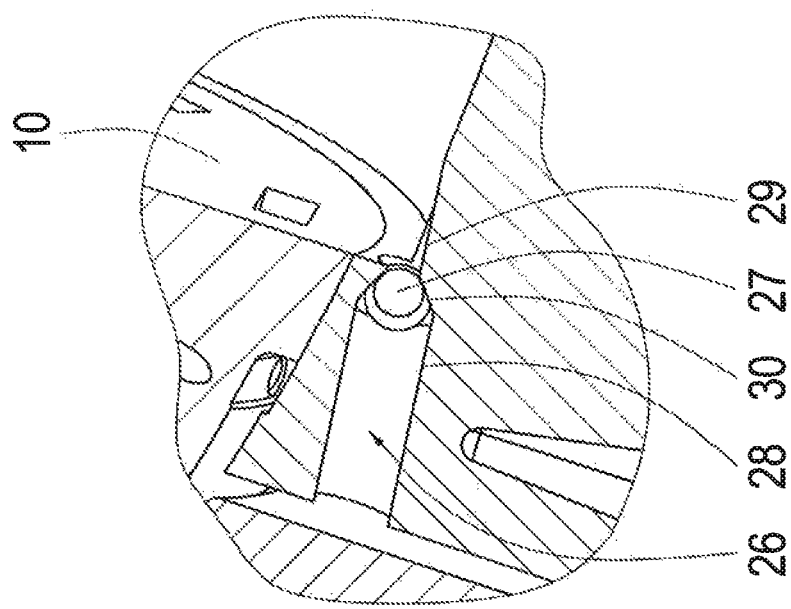
Figure 10A:
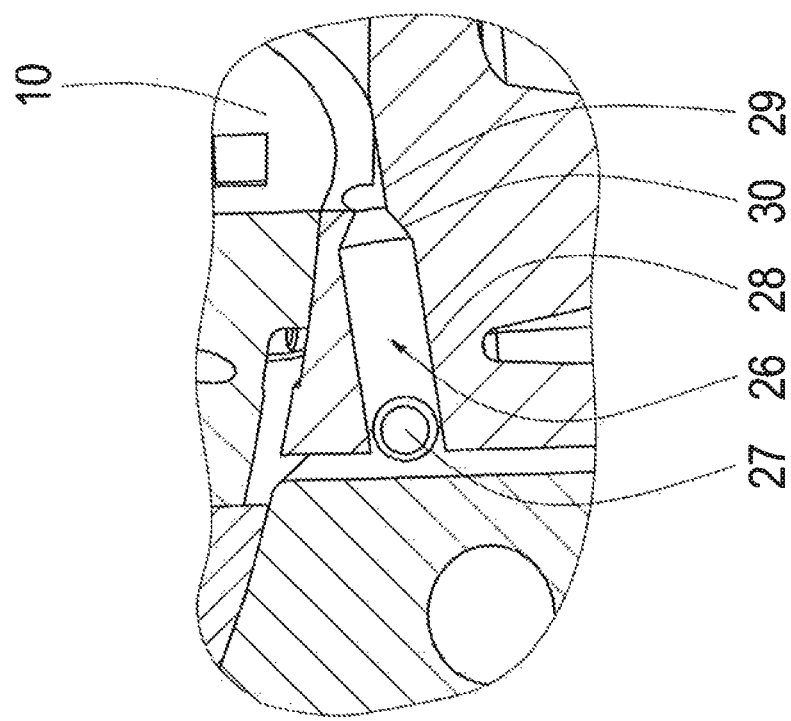

FIG. 10 shows a three-dimensional, partially cut view of the differential gear 2 from FIG. 2. Thereby, a bypass channel 26 with a valve retaining element 27 is visible inside the housing 7. FIGS. 10a and 10b (in each case, a view of the area C of FIG. 10) thereby show an enlargement of various operating states of the bypass channel 26 and the valve retaining element 27. FIG. 10a shows the valve retaining element 27 in an open position. FIG. 10b shows the valve retaining element 27 in a closed position. The bypass channel 26 is arranged in a manner parallel to the gap-type seal 12 and connects the first volume V1 and a second volume V2. The bypass channel 26 features a preferably cylindrical section 28 with a larger diameter, a preferably cylindrical section 29 with a smaller diameter and an interstitial section 30 that connects the first-mentioned sections 28, 29. For this purpose, the section 30 may be, in particular, cone-shaped or concave-shaped. Preferably, a ball with an external diameter, which lies between the internal diameter of the section 28 and the internal diameter of the section 29, serves as a valve retaining element 27. Alternatively, a valve retaining element 27 can be provided, which features (only in sections) the form of a ball, which is semi-spherical (for example), or which features another suitable form. The section 30 forms a valve seat for the valve retaining element 27. Thereby, a non-return valve is formed.

The valve retaining element 27, in its opening position (FIG. 10a), in which the valve retaining element 27 releases the bypass channel 26, is located in a horizontal position of the axle 1 or without lateral acceleration. In this operating state, oil may bypass on the side at the valve retaining element 27, into the volume V1. Under the influence of inertial force, such as gravity or centrifugal force, the valve retaining element 27, upon a lateral inclination of the axle and/or upon on a lateral acceleration, is shifted into its closed position (FIG. 10b), in which the valve retaining element 27 fits tightly at the section 30 of the bypass channel 26. Thus, leakage oil that has arrived in the second volume V2 through the gap-type seal 12 from the first volume V1 is led back from the second volume V2 into the first volume V1. At the same time, the flowing back into the second volume V2 through the bypass channel 26 is largely prevented.

Modifications and variations can be made to the embodiments illustrated or described herein without departing from the scope and spirit of the invention as set forth in the appended claims.

The invention claimed is:

1. A drive axle for a motor vehicle, comprising:
   a differential gear;
   an axle shaft configured in an axle tube;
   a gear bearing mounting the axle shaft to the differential gear;
   the differential gear comprising a lubricant volume that is separated from the axle tube by a gap-type seal comprising a first form section on the axle shaft that cooperates with a second form section on the axle tube or on the differential gear; and
   a bypass channel in the differential gear around the gap-type seal, the bypass channel including a one-way valve therein.

2. The drive axle as in claim 1, wherein the gap-type seal further comprises a sealing element arranged on the axle shaft, the first form section defined at an outer surface of the sealing element on the axle shaft.

3. The drive axle as in claim 2, wherein the gap-type seal further comprises a setting nut or setting disk that surrounds the sealing element, the second form section defined at a radially inner surface of the setting nut or setting disk on the axle tube or on the differential gear.

4. The drive axle as in claim 3, wherein the setting nut or setting disk comprises an internal lubricant reservoir, the setting nut or setting disk further comprising lubricant channels through which lubricant flows into and out of the lubricant reservoir, thereby limiting the lubricant reservoir.

5. The drive axle as in claim 1, wherein the first form section and the second form section generate a conveying effect on the lubricant upon rotation of the axle and first form section.

6. The drive axle as in claim 5, comprising a conveyor groove operatively configured on one of the first form section or the second form section.

7. The drive axle as in claim 6, wherein the conveyor groove is defined as a spiral-shaped groove defined on the first form section.

8. The drive axle as in claim 7, wherein the conveyor groove generates the conveying effect for the lubricant in a direction towards the differential gear upon rotation of the axle.

9. A drive axle for a motor vehicle, comprising:
   a differential gear;
   an axle shaft configured in an axle tube;
   a gear bearing mounting the axle shaft to the differential gear; and
   the differential gear comprising a lubricant volume that is separated from the axle tube by a gap-type seal defined between an inner surface of a first form section on the axle shaft and an outer surface of a second form section on the axle tube or on the differential gear, and wherein the first form section does not contact the second form section at the gap-type seal.

* * * * *